United States Patent
Jaswal et al.

(10) Patent No.: US 12,479,276 B2
(45) Date of Patent: Nov. 25, 2025

(54) VEHICLE DOOR ASSEMBLY WITH A DEPLOYABLE STRUCTURAL PILLAR

(71) Applicant: Rivian IP Holdings, LLC, Irvine, CA (US)

(72) Inventors: Raghav Jaswal, Irvine, CA (US); Philipp J. Wolf, Irvine, CA (US); Mark Andrew Jones, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 295 days.

(21) Appl. No.: 18/112,714

(22) Filed: Feb. 22, 2023

(65) Prior Publication Data

US 2024/0278626 A1   Aug. 22, 2024

(51) Int. Cl.
*B60J 5/04* (2006.01)
*B62D 25/04* (2006.01)

(52) U.S. Cl.
CPC ............ *B60J 5/0479* (2013.01); *B62D 25/04* (2013.01)

(58) Field of Classification Search
CPC . B60J 5/0479; B60J 5/0477; B60J 5/10; B60J 5/101; B60J 5/108
USPC ...................... 296/150, 147, 146.8
See application file for complete search history.

(56) References Cited

U.S. PATENT DOCUMENTS

| | | | | |
|---|---|---|---|---|
| 2,265,434 | A * | 12/1941 | Kibbey | A61G 21/00 49/366 |
| 5,441,324 | A * | 8/1995 | Gold | B60P 1/00 296/26.11 |
| 8,342,592 | B2 * | 1/2013 | Konchan | B60J 10/87 16/334 |
| 9,849,759 | B2 * | 12/2017 | Lovelace | E06B 3/362 |

\* cited by examiner

*Primary Examiner* — Dennis H Pedder
(74) *Attorney, Agent, or Firm* — BAKERHOSTETLER

(57) ABSTRACT

A vehicle door assembly including: a first door; a second door, wherein both the first door and the second door are pivotable between an open configuration and a closed configuration with respect to a chassis of a vehicle; and a structural member, wherein the structural member is deployable from the first door and behind the second door at a junction between the first door and the second door when in the closed configuration. Each of the first door and the second door is pivotable to the open configuration and to the closed configuration regardless of the other of the first door or the second door being in the open configuration or in the closed configuration. Also, the structural member is pivotably deployed. The structural member is constrained by a track structure coupled to the chassis of the vehicle at a top portion and at a bottom portion of the structural member.

20 Claims, 11 Drawing Sheets

VEHICLE DOOR ASSEMBLY WITH A DEPLOYABLE STRUCTURAL PILLAR

INTRODUCTION

The present disclosure relates generally to the automotive field. More particularly, the present disclosure relates to a vehicle door assembly with a deployable structural pillar.

Vehicles may be built with structural pillars. Some structural pillars act as a support beam between two closures of a vehicle, such as a B-pillar, which may form a support beam between the side doors and/or side windows of a vehicle. It may be desirable for a vehicle to have structural elements to provide vehicle strength, while enabling users to conveniently enter or exit a vehicle and/or conveniently load or unload cargo into or out of the vehicle. A similar support beam may be provided between rear doors of a vehicle.

The present introduction is provided as background context only and is not intended to be limiting in any manner. It will be readily apparent to those of ordinary skill in the art that the concepts and principles of the present disclosure may be implemented in other applications and contexts equally.

SUMMARY

The present disclosure relates to a vehicle door assembly with a deployable structural pillar. This vehicle door assembly enables adjacent doors such as a front door and a rear door, or adjacent back doors, to open and close in any sequence regardless of the other door being open or closed. In an example of a front door and a rear door, both doors are pivotable between open and closed configurations with respect to the chassis of the vehicle. The vehicle door assembly includes a structural member that is deployable from one of the doors and behind an edge of the other door at a junction between the two doors when in the closed configuration. Movement of the structural member to a closed configuration may be constrained by a track structure coupled to the chassis of the vehicle, where top and bottom portions of the structural member follow tracks of the track structure. The vehicle door assembly further includes latching mechanisms that secure the doors and optionally the structural member to the chassis of the vehicle.

In one illustrative embodiment, the present disclosure provides a vehicle door assembly including: a first door; a second door, wherein both the first door and the second door are pivotable between an open configuration and a closed configuration with respect to a chassis of a vehicle; and a structural member, wherein the structural member is deployable from the first door and behind the second door at a junction between the first door and the second door when in the closed configuration. Optionally, each of the first door and the second door is pivotable to the open configuration and to the closed configuration regardless of the other of the first door or the second door being in the open configuration or in the closed configuration. The structural member is pivotably deployed. The structural member is constrained by a track structure coupled to the chassis of the vehicle at a top portion and at a bottom portion of the structural member. The vehicle door assembly further includes a seal between the structural member and each of the first door and the second door. The vehicle door assembly further includes one or more latching mechanisms that secure the first door and the second door to the chassis of the vehicle. Optionally, the structural member forms a B-pillar of the vehicle. Optionally, the structural member forms a center pillar at a rear of the vehicle.

In another illustrative embodiment, the present disclosure provides a vehicle door assembly including: a first door, wherein the first door is pivotable between an open configuration and a closed configuration with respect to a chassis of a vehicle; and a structural member, wherein the structural member is deployable from the first door and behind a second door at a junction between the first door and the second door when in the closed configuration. Optionally, each of the first door and the second door is pivotable to the open configuration and to the closed configuration regardless of the other of the first door or the second door being in the open configuration or in the closed configuration. The structural member is pivotably deployed. The structural member is constrained by a track structure coupled to the chassis of the vehicle at a top portion and at a bottom portion of the structural member. The vehicle door assembly further includes a seal between the structural member and each of the first door and the second door. The vehicle door assembly further includes one or more latching mechanisms that secure the first door and the second door to the chassis of the vehicle. Optionally, the structural member forms a B-pillar of the vehicle. Optionally, the structural member forms a center pillar at a rear of the vehicle.

In a further illustrative embodiment, the present disclosure provides a method for manufacturing a structural assembly for a door assembly for a vehicle, the method comprising: forming a first door, wherein the first door is pivotable between an open configuration and a closed configuration with respect to a chassis of a vehicle; and forming a structural member, wherein the structural member is deployable from the first door and behind a second door at a junction between the first door and the second door when in the closed configuration. Optionally, each of the first door and the second door is pivotable to the open configuration and to the closed configuration regardless of the other of the first door or the second door being in the open configuration or in the closed configuration. The structural member is pivotably deployed. The structural member is constrained by a track structure coupled to the chassis of the vehicle at a top portion and at a bottom portion of the structural member.

BRIEF DESCRIPTION OF THE DRAWINGS

The present disclosure is illustrated and described with reference to the various drawings, in which like reference numbers are used to denote like assembly components and/or method steps, as appropriate, and in which.

All figures are shown with appropriate transparency to reveal internal structures where helpful.

DETAILED DESCRIPTION

Figure 1:
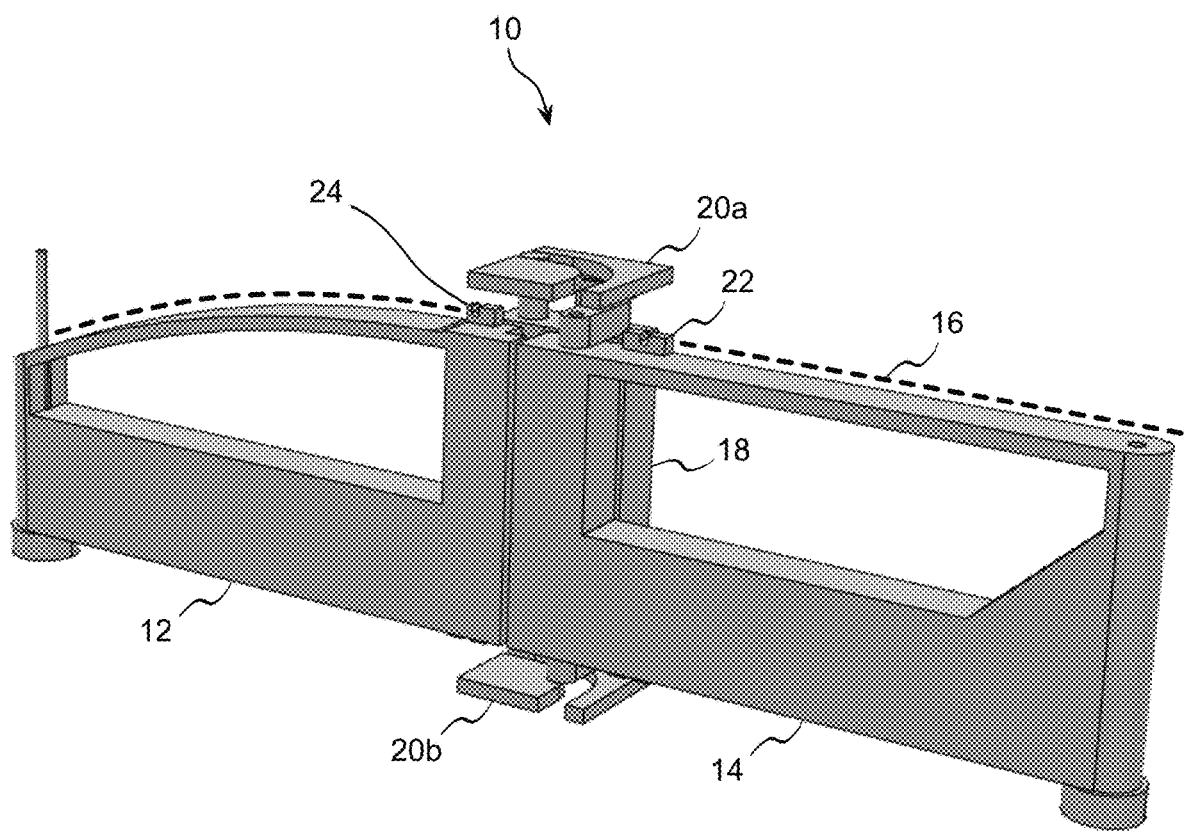
FIG. 1 is a perspective view of one illustrative embodiment of a vehicle door assembly in a closed configuration.

FIG. 1 is a perspective view of one illustrative embodiment of a vehicle door assembly 10 in a closed configuration. As contemplated herein, the vehicle door assembly 10 includes a front door 12 (also referred to herein more broadly as a first door 12 or simply a door 12) and a rear door 14 (also referred to herein more broadly as a second door 14 or simply a door 14) that are hingedly coupled to a chassis 16 of a vehicle (indicated with dotted lines) enabling both the front door 12 and the rear door 14 to pivot between the closed configuration as shown and an open configuration (shown in FIG. 4 through FIG. 7) with respect to the chassis 16. For clarity, this side of the vehicle door assembly 10 is the exterior side of the vehicle. As described in more detail herein, the vehicle door assembly 10 enables each of the front and rear doors 12 and 14 to be pivotable to the open and closed configurations regardless of the other door being in the open or closed configuration. In other words, the front and rear doors 12 and 14 open and close independently from one another and can open and close in any sequence. For example, the front door 12 is pivotable from the closed configuration to the open configuration, and vice versa, while the rear door 14 remains in the closed configuration. Similarly, the rear door 14 is pivotable from the closed configuration to the open configuration, and vice versa, while the front door 12 remains in the closed configuration. While one door opens or closes, the other door may remain closed and latched shut for safety reasons. The vehicle door assembly 10 also includes a structural member 18, upper and lower track structure members 20a and 20b, collectively referred to as track structure 20, and latching mechanisms 22 and 24. Door opening, closing, and/or latching can be controlled manually or electronically, such as using a graphical user interface (GUI). As described in more detail herein, the structural member 18 functions as a B-pillar when in the closed configuration. These features are described in more detail herein in the context of the other figures. In the embodiment illustrated, the front door 12 is pivotably coupled to the chassis 16 at a front portion thereof, while the rear door 14 is pivotably coupled to the chassis 16 at a rear portion thereof. These doors 12 and 14 could also be left and right back doors disposed at the back of the chassis 16, or at any other location in the chassis 16. First door 12 is used herein to refer to front door 12 or the left door 12, while second door 14 is used herein to refer to the rear door 14 or the right door 14, although first and second can be switched depending upon the application. It should be noted that the vehicle contemplated herein may have doors 12 and 14 that may be manually or automatically opened, closed, and/or locked. In the case that an automatic mechanism is used, the vehicle includes appropriate control and actuation systems, well known to those of ordinary skill in the art.

Figure 2:
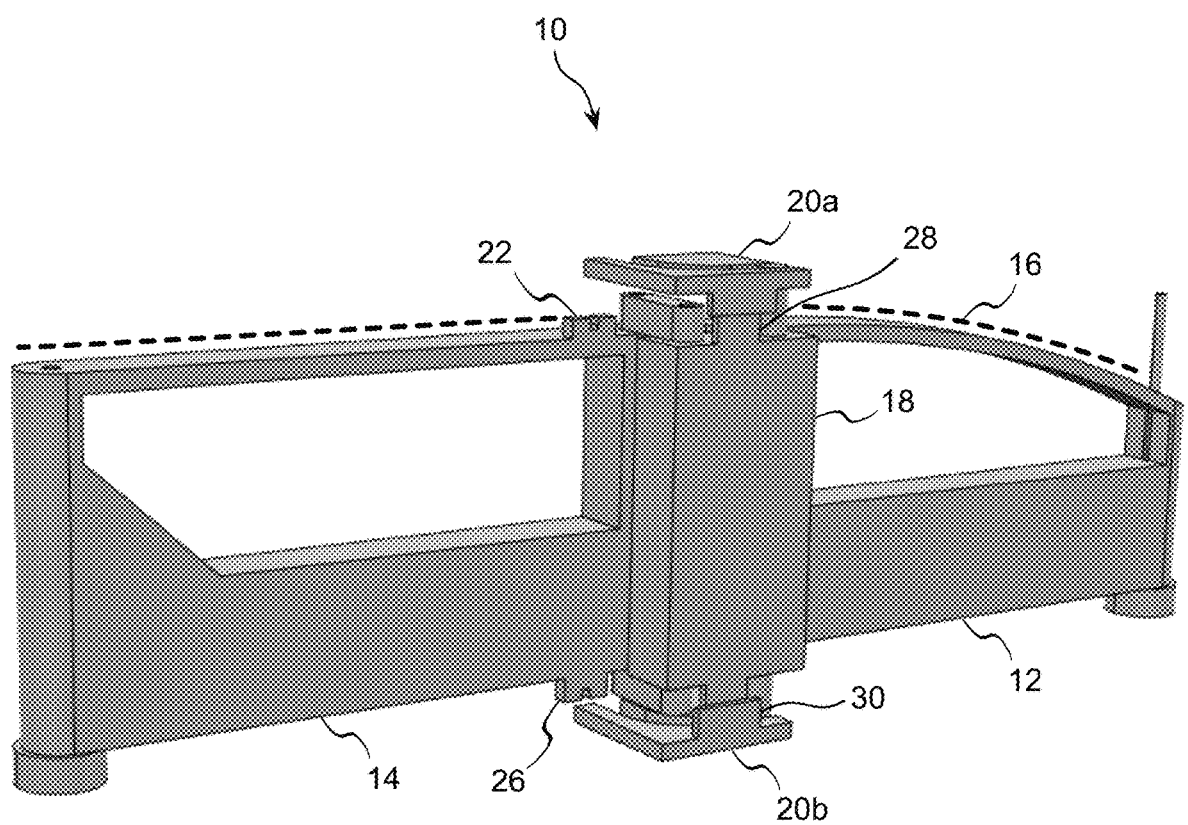
FIG. 2 is another perspective view of one illustrative embodiment of the vehicle door assembly showing the other side of vehicle door assembly 10 in a closed configuration.

FIG. 2 is another perspective view of the vehicle door assembly 10 of FIG. 1 showing the other side of vehicle door assembly 10 in the closed configuration. Shown are the front door 12, the rear door 14, the chassis 16 (again, indicated with dotted lines), the structural member 18, the upper and lower track structure members 20a and 20b, and latching mechanisms 22, 26, 28, and 30. For clarity, this side of the vehicle door assembly 10 in this example is the interior side or the side that faces the occupant space of the vehicle. In some configurations, latching mechanisms (e.g., latching mechanism 28) may include protrusions configured to interface with the track structure 20 in a closed configuration to constrain movement of the structural member 18 and/or provide additional lateral strength (e.g., in a direction external to a vehicle toward a side of the vehicle) to the vehicle door assembly 10 when in the closed configuration.

Figure 3:
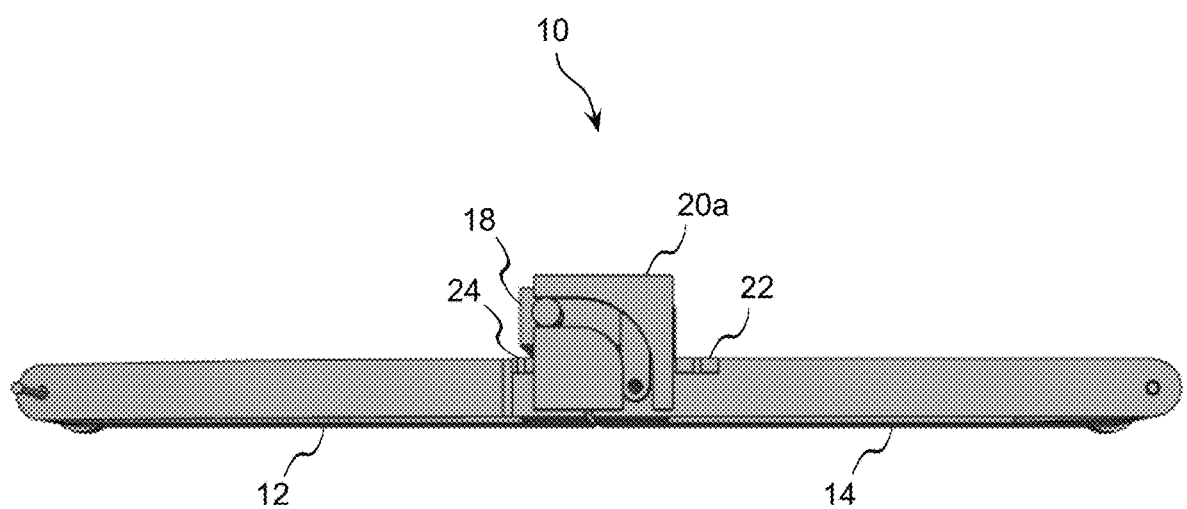
FIG. 3 is a top view of one illustrative embodiment of the vehicle door assembly in a closed configuration.

FIG. 3 is a top view of the vehicle door assembly 10 in the closed configuration. Shown are the front door 12, the rear door 14, the structural member 18, the upper track structure member 20a, and the latching mechanisms 22 and 24. Referring to FIGS. 1, 2, and 3, the vehicle door assembly 10 also includes the structural member 18 shown behind (i.e., on the interior side of) the front and rear doors 12 and 14. The structural member 18 is deployable from the rear door 14 and behind the front door 12 at a junction between the front and rear doors 12 and 14 when in the closed configuration. As described in more detail below, the structural member 18 is pivotably deployed from the rear door 14. The vehicle door assembly 10 also includes the upper track structure members 20a and lower track structure 20b (shown in FIGS. 1 and 2), collectively referred to as track structure 20. The structural member 18 is constrained by the track structure members 20a and 20b, which are coupled to the chassis 16 (shown in FIGS. 1 and 2) of the vehicle at respective top and bottom portions of the structural member 18.

In this example embodiment, the structural member 18 functions as a rigid, vertical beam or B-pillar behind and the junction of the front and rear doors when in the closed configuration. In contrast to B-pillars integrated into the chassis 16 of the vehicle that remain attached to the chassis 16 when the doors 12 and 14 are open, the structural member 18 is integrated with the rear door 14 and detaches from the chassis 16 when the rear door is open. This enables the front and rear doors 12 and 14 to swing out similarly to French doors, thereby providing easier entry into and exit from the vehicle by either people or cargo. When in the closed configuration, the structural member 18 protects the integrity of chassis 16 by providing rigidity and strength to the chassis 16 in the event of a side impact (e.g., by another vehicle) or the vehicle rolling over. The vehicle door assembly 10 may also include a seal between the structural member 18 and each of the first door 12 and the second door 14. The seal may be any rubber material between the structural member and the doors. The seal functions as a weather seal that prevents outside elements such as water, wind, noise, and pests from entering the interior or occupant space of the vehicle. The seal may be attached to either structural member 18 or to the front and rear doors 12 and 14, or any combination thereof.

The latching mechanisms 22 and 26 (FIG. 2) on the rear door secure the rear door 14 to the chassis 16 of the vehicle when the rear door 14 is in the closed configuration. Similarly, the latching mechanisms 24 (FIG. 1) and another latching mechanism (shown in FIG. 4) on the front door 12 secure the front door 12 to the chassis 16 of the vehicle when the front door 12 is in the closed configuration. Similarly, the latching mechanisms 28 and 30 (FIG. 2) on the structural member 18 secure the structural member 18 to the chassis 16 of the vehicle when the structural member 18 is in the closed configuration. These latching mechanisms described may employ any suitable latching techniques (e.g., latching techniques using a rotary latch, tongue, etc.), which will depend on the particular implementation.

Figure 4:
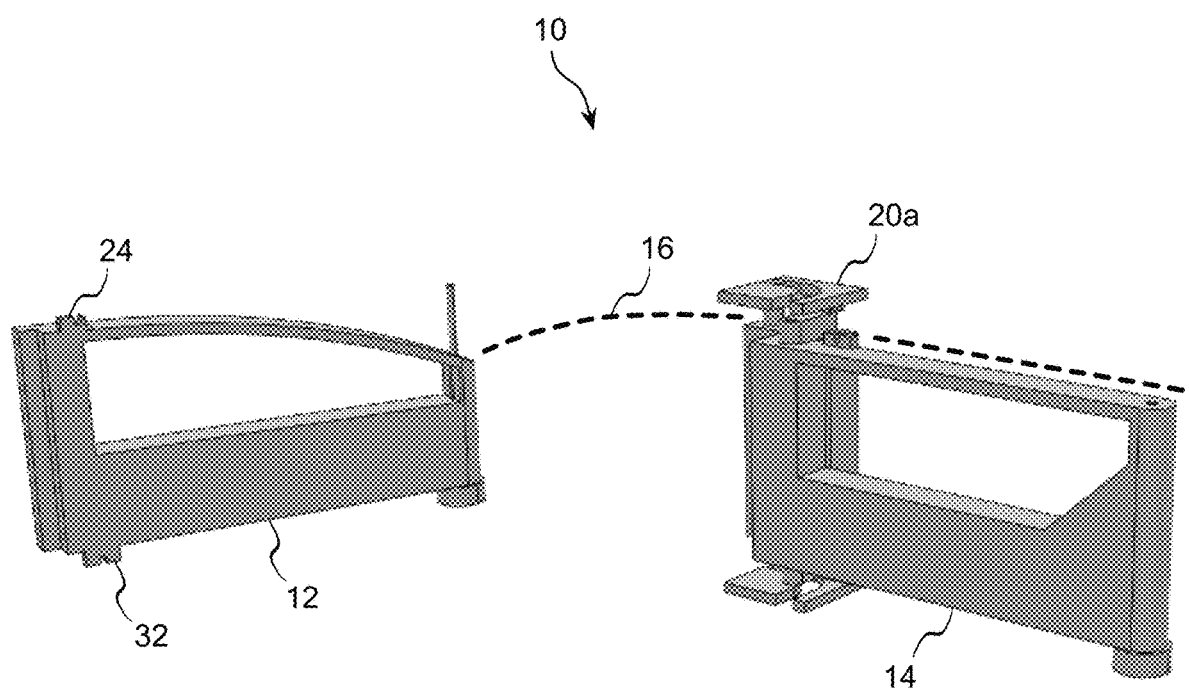
FIG. 4 is a perspective view of one illustrative embodiment of the vehicle door assembly, where the front door is in an open configuration and the rear door is in a closed configuration.

FIG. 4 is a perspective view of the vehicle door assembly 10, where the front door 12 is in an open configuration and the rear door 14 is in the closed configuration. Also shown are the upper track structure member 20a, and latching mechanisms 24 and 32. For ease of illustration, not all elements are re-referenced in all figures and are re-referenced as needed for clarity.

Figure 5:
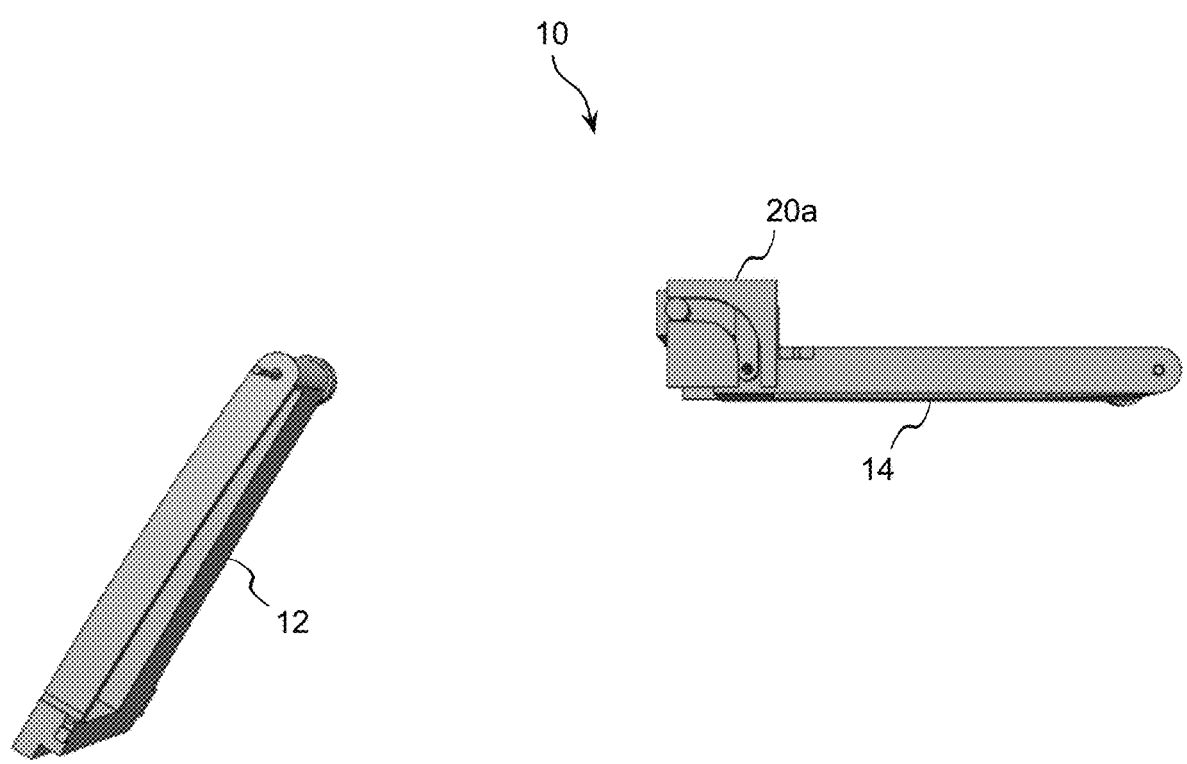
FIG. 5 is a top view of one illustrative embodiment of the vehicle door assembly, where the front door is in an open configuration and the rear door is in a closed configuration.

FIG. 5 is a top view of the vehicle door assembly 10 as shown in FIG. 4, where the front door 12 is in an open configuration and the rear door 14 is in a closed configuration. Also shown is the the upper track structure member 20a. Referring to FIGS. 4 and 5, the front door 12 is hingedly coupled to the chassis 16 (FIG. 4) allowing the front door 12 to pivot outward away from the track structure 20 to the open configuration as shown, and pivot inward to the closed configuration (shown in FIG. 1).

Figure 6:
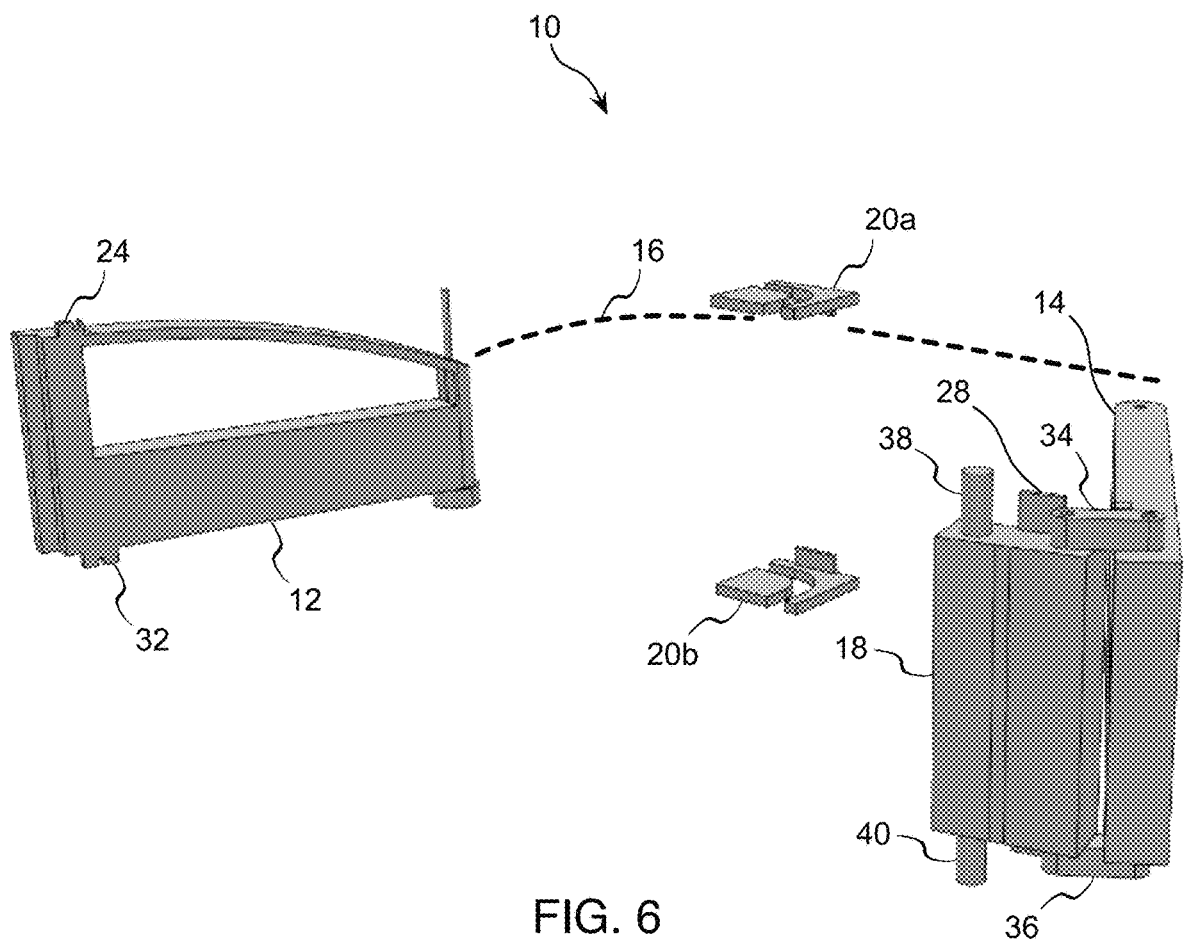
FIG. 6 is a perspective view of one illustrative embodiment of the vehicle door assembly, where both the front and rear doors are in an open configuration.

FIG. 6 is a perspective view of the vehicle door assembly 10, where both the front and rear doors 12 and 14 are in the open configuration. Also shown are chassis 16, track structure members 20a and 20b, structural member 18, pivot linkages 34 and 36, protrusions 38 and 40, and latching mechanisms 24, 32, and 28.

Figure 7:
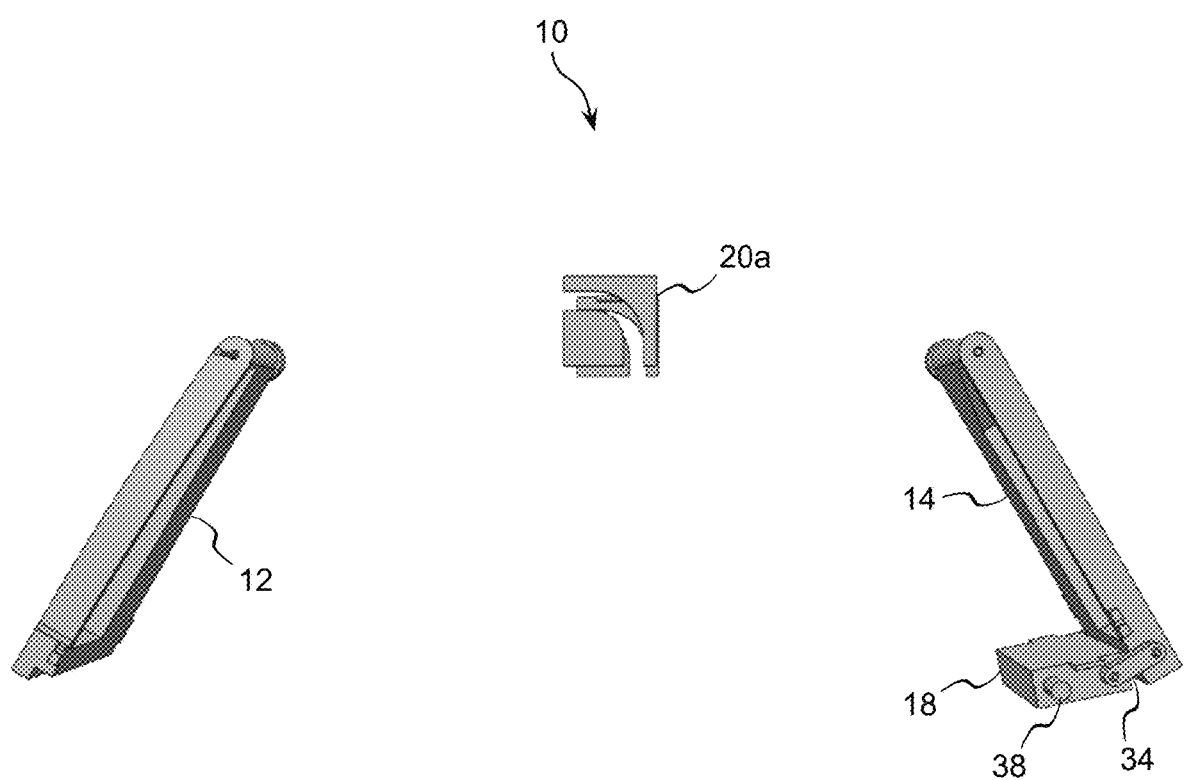
FIG. 7 is a top view of one illustrative embodiment of the vehicle door assembly, where both the front door and the rear door are in an open configuration.

FIG. 7 is a top view of the vehicle door assembly 10, where both the front door 12 and the rear door 14 are in the open configuration. Also shown is the structural member 18, the upper track structure member 20a, the pivot linkage 34, and the protrusion 38. Referring to FIGS. 6 and 7, similar to the front door 12, the rear door 14 is also hingedly coupled to the chassis 16 allowing the rear door 14 to pivot outward away from the track structure 20 to the open configuration as shown, and also pivot inward to the closed configuration (shown in FIGS. 1 and 2).

The structural member 18 is pivotally coupled to the rear door 14 via the pivot linkages 34 and 36. The pivot linkage 34 and the pivot linkage 36 (FIG. 6) enable the structural member 18 to pivot behind the front door 12 and the rear door 14 when in the closed configuration (FIGS. 1 and 2). The structural member 18 includes bar extensions or protrusions 38 and 40 that engage respective track structure members 20a and 20b. The structural member 18 having two points of contact or two protrusions that engage the upper and lower track structure members 20a and 20b provides added stability and strength to the overall vehicle door assembly 10 as the structural member 18 engages the track structure 20 to the closed configuration. Deployment of the structure member 18 from the rear door 14 and engagement of the structural member 18 with the track structure 20 are described in more detail below.

FIGS. 8, 9, 10, and 11 are perspective views of illustrative embodiments of the vehicle door assembly 10, where the structural member 18 is in different positions relative to the track structure 20. Also shown in these figures are the front door 12, the rear door 14, the pivot linkage 34, the protrusion 38, and track structure members 20a and 20b, and tracks 42 and 44.

Figure 8:
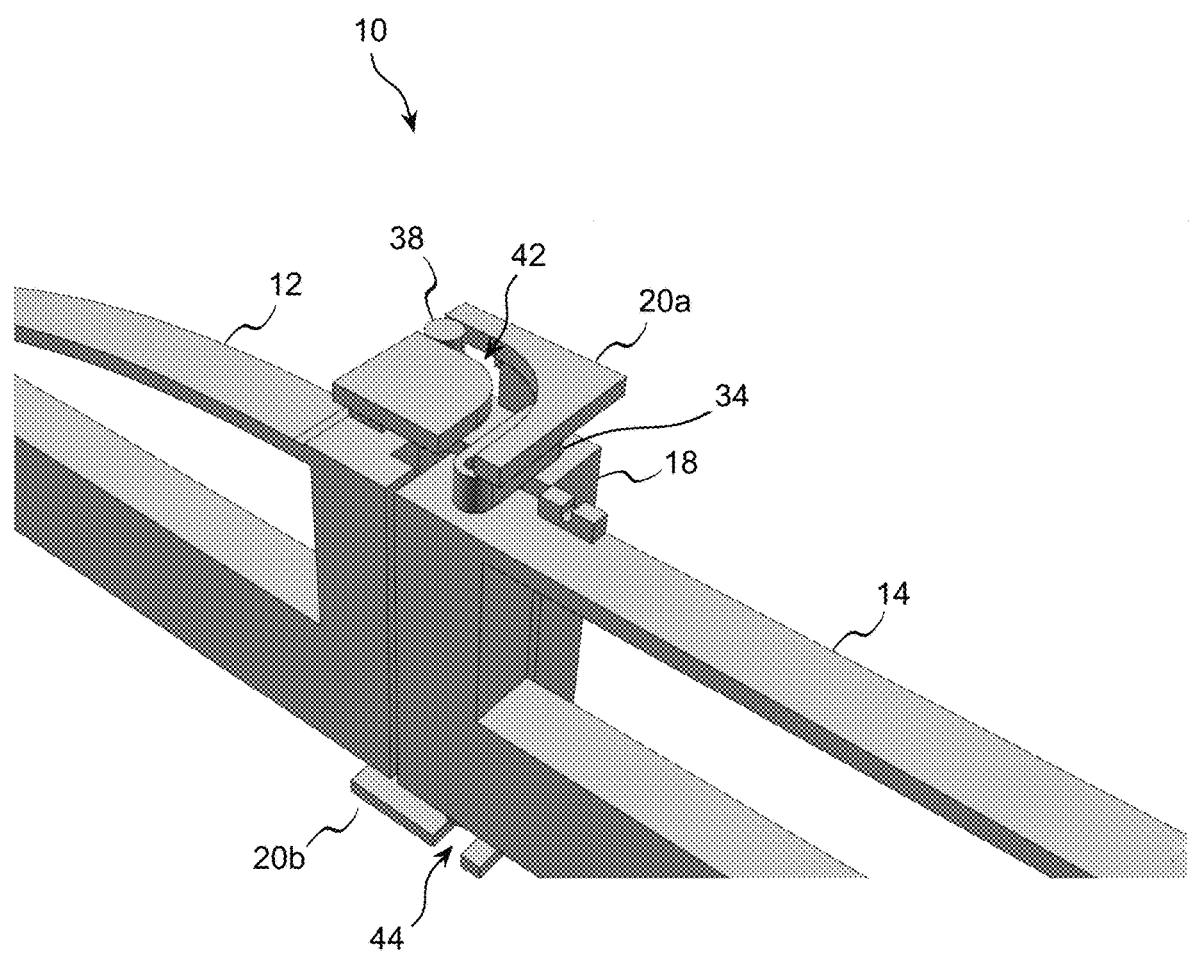
FIG. 8 is a perspective view of one illustrative embodiment of the vehicle door assembly, where the rear door and the structural member are in a fully closed configuration.

FIG. 8 is a perspective view of the vehicle door assembly 10, where the rear door 14 and the structural member 18 are in a fully closed configuration. As shown, the protrusion 38 of the structural member 18 is at one end of the track 42 of the upper track structure member 20a. Similarly, the protrusion 40 (shown in FIG. 6) is at a corresponding end of the track 44 of the lower track structure member 20b. The shape or route of the tracks 42 and 44 are substantially straight at both ends of the tracks 42 and 44 in order to enable the protrusions 38 and 40 to initially engage and enter the tracks 42 and 44 with ease when the rear door 14 closes to the closed configuration. This straight geometry at the ends of the tracks 42 and 44 also constrains and guides the protrusions 38 and 40 (FIG. 6) so as to enable the structural member 18 to also travel sufficiently to lie substantially flush against both the front door 12 and the rear door 14 (e.g., along a plane parallel to the planes of the front door 12 and the rear door 14) and over the junction between the front and rear doors 12 and 14 when in the closed configuration (as shown in FIGS. 1, 2, 3 and 8). The structural member 18 lying flat or flush against both the front and rear doors 12 and 14 provides strength to the overall vehicle door assembly 10 and an appropriate seal between the structural member 18 and the front and rear doors 12 and 14 when in the closed configuration. For example, when in the closed configuration, a first surface of the structural member 18 may lie substantially flush against both an inner surface of the first door 12 and an inner surface of the second door 14, while a second surface of the structural member 18 (e.g., opposite the first surface) may lie substantially flush against the vehicle chassis 16 or against a portion of the track structure 20 which is substantially flush against a surface of the vehicle chassis 16. The middle portion of the tracks 42 and 44 may be rounded in order to enable a smooth transition and travel of the protrusions 38 and 40 along the tracks 42 and 44 from one end to the other end of the tracks 42 and 44.

In lengths of the pivot linkage 34 and the pivot linkage 36 (FIG. 6) are sufficiently long so as to enable the structural member 18 to not contact the rear door when pivoting and also to enable the structural member pivot greater than 90 degrees. Such a pivoting range enables the protrusion 38 and the protrusion 40 (FIG. 6) to enter their respective tracks 42 and 44 at appropriate angles thereby enabling ease of engagement between the protrusions 38 and 40 and the respective tracks 42 and 44. The particular shape and size of the opening of the tracks 42 and 44 may vary, depending on the particular implementation. For example, the openings may be sufficiently larger and/or may have a funnel shape in order to more easily receive the respective protrusions 38 and 40 and to properly guide the protrusions into tracks 42 and 44. The hinge mechanisms of the pivot linkages 34 and 36 may allow some longitudinal movement of the structural member 18 along the pivot linkages 34 and 36. This enables the structural member 18 to be sufficiently pressed against the front and rear doors 12 and 14 to form a proper seal after the pivoting action completes and when in the closed position.

Figure 9:
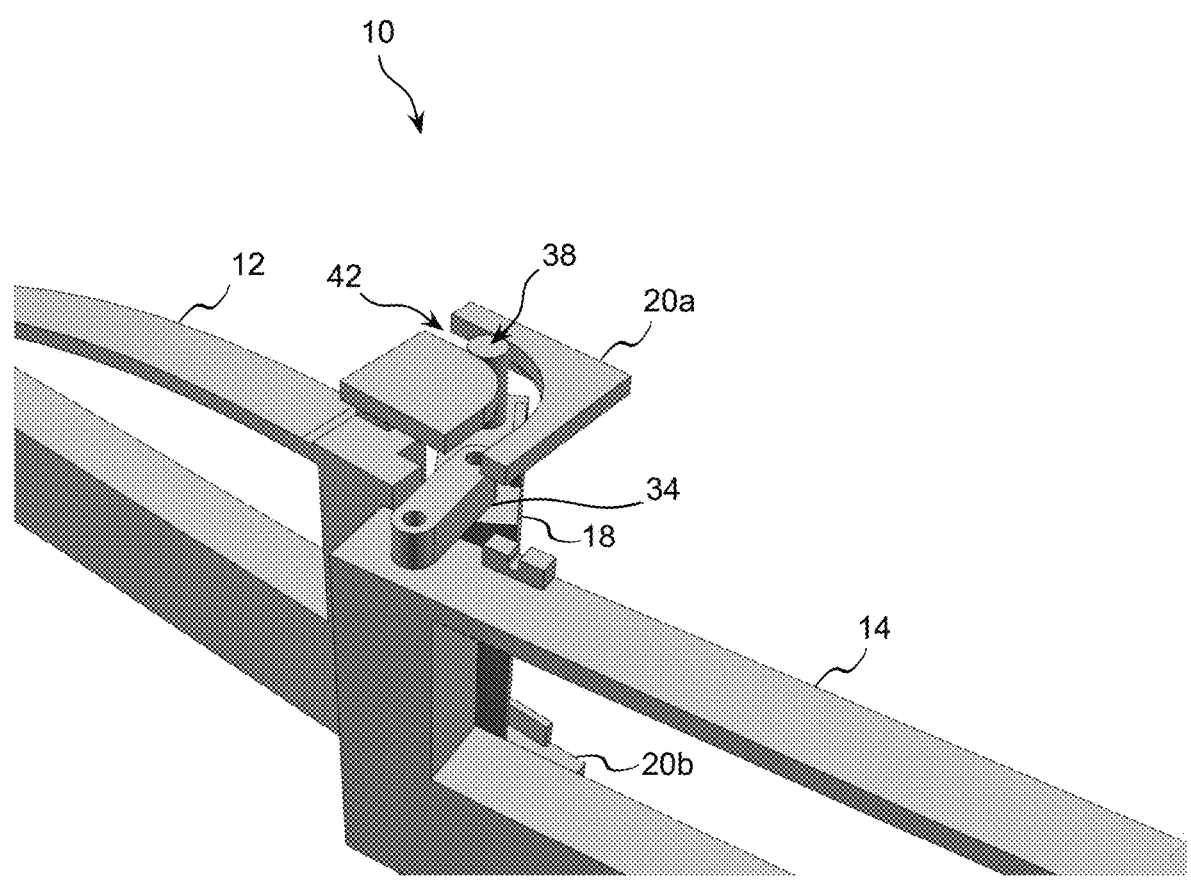
FIG. 9 is a perspective view of one illustrative embodiment of the vehicle door assembly, where the rear door is in a partially open configuration.

FIG. 9 is a perspective view of the vehicle door assembly 10, where the rear door 14 is in a partially open configuration and the front door 12 is in a fully closed configuration. As shown, the protrusion 38 is coupled to the rear door 14 via the structural member 18 and the pivot linkage 34. Accordingly, as the rear door 14 opens and pivots away from the track structure 20, the protrusion 38 follows the rear door 14 along track 42 of the upper track structure member 20*a*. Similar to the protrusion 38, the protrusion 40 (FIG. 6) also follows the rear door 14 along the track 44 (FIGS. 8 and 11) of the lower track structure member 20*b*.

Figure 10:
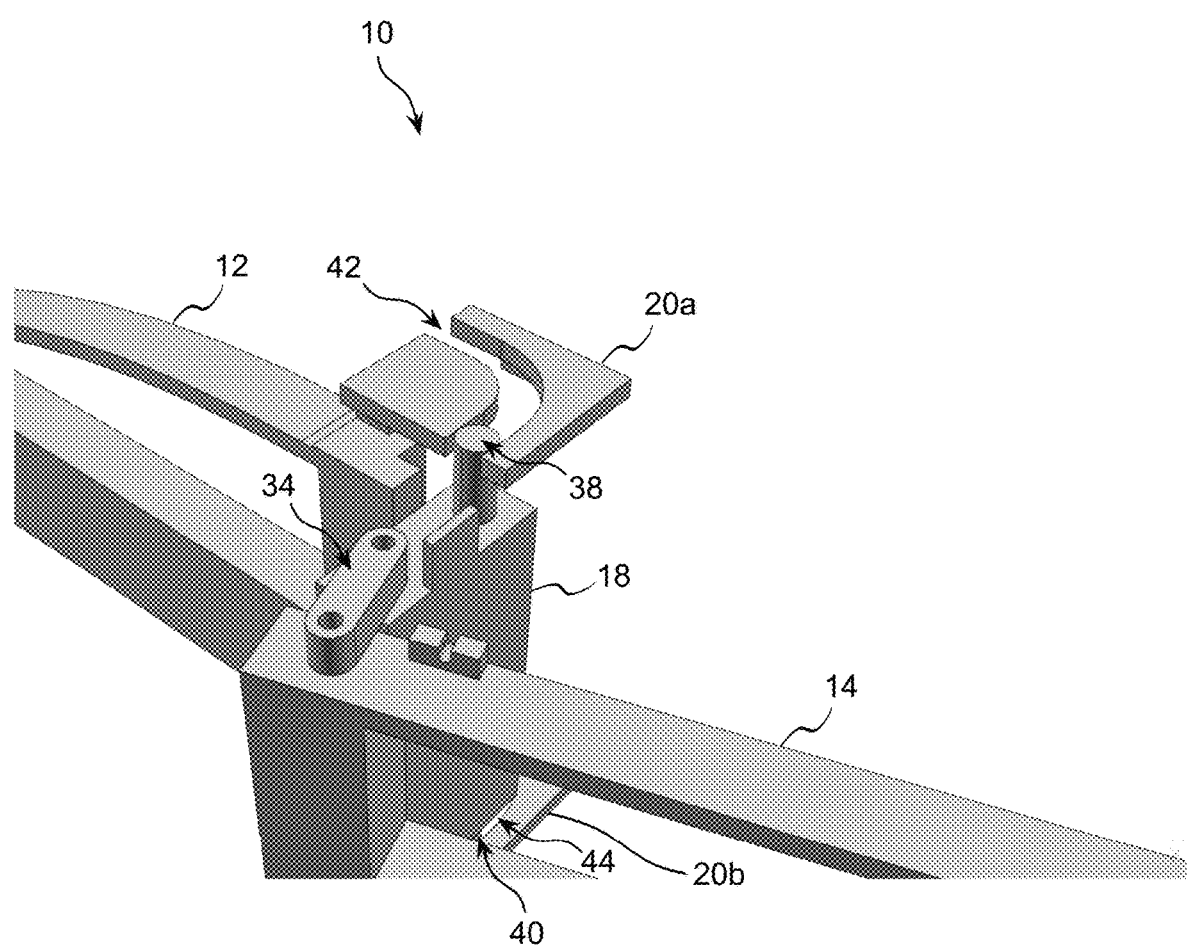
FIG. 10 is a perspective view of one illustrative embodiment of the vehicle door assembly, where the rear door is in a partially open configuration and the protrusions are at the other end of their respective tracks.

FIG. 10 is a perspective view of the vehicle door assembly 10, where the rear door 14 is in a partially open configuration and the protrusions 38 and 40 are at the other end of their respective tracks 42 and 44.

Figure 11:
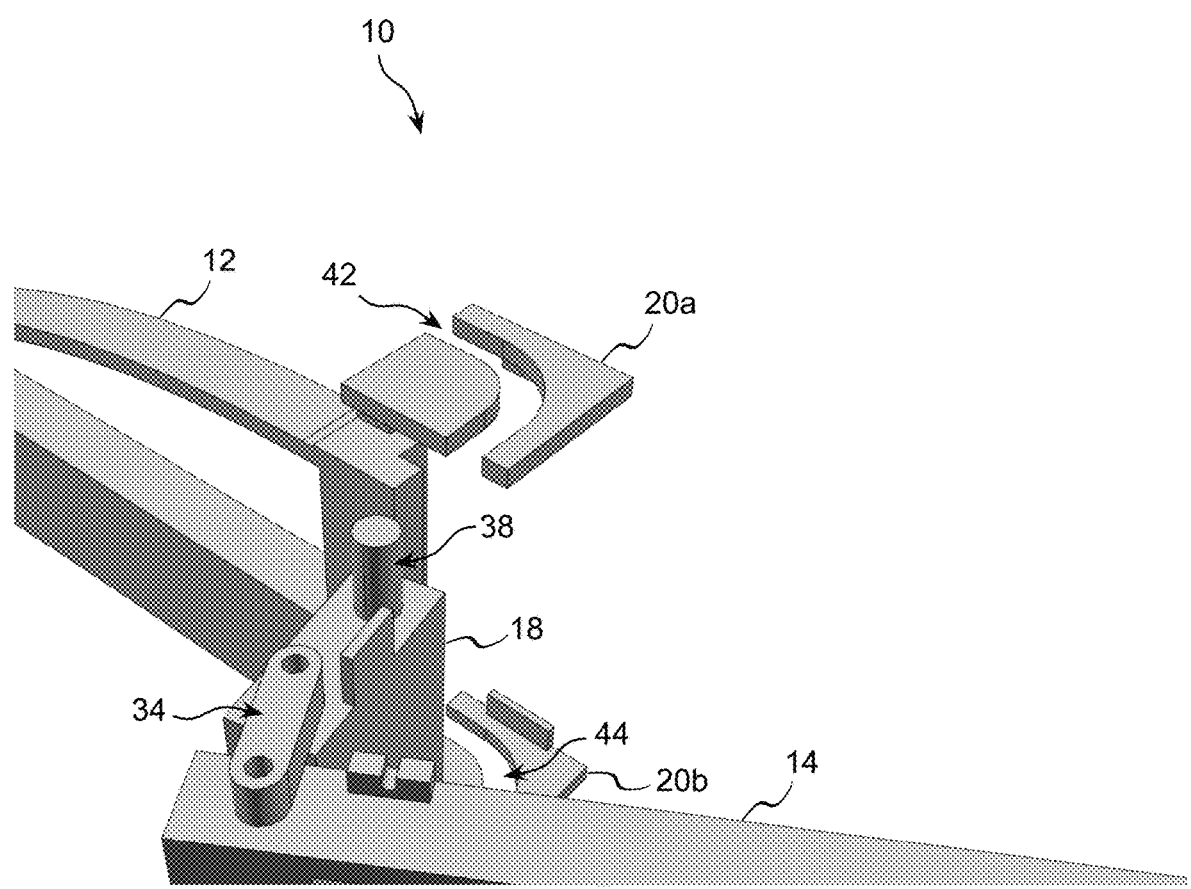
FIG. 11 is a perspective view of one illustrative embodiment of the vehicle door assembly, where the rear door is in a partially open configuration and the structural member is no longer engaged with the track structure.

FIG. 11 is a perspective view of the vehicle door assembly 10, where the rear door 14 is in a partially open configuration and the structural member 18 is no longer engaged with the track structure 20.

When the rear door 14 closes and pivots back to the closed configuration and the structural member 18 engages with the track structure 20, the protrusion 38 and the protrusion 40 (FIG. 6) enter their respective tracks 42 and 44 in a similar manner as shown in FIG. 10. As the rear door fully closes to closed configuration, the protrusions 38 and 40 reach the end of their respective tracks 42 and 44 in a similar manner as shown in FIG. 8.

While various example embodiments are described herein in the context of the structural member 18 being deployed from the rear door 14, a structural member may alternatively be deployed from the front door 12, depending on the particular embodiment. In such a scenario, the track structure would be configured accordingly (e.g., mirror image). Also, while various example embodiments are described in the context of the vehicle door assembly 10 being on the front and rear doors 12 and 14 on the left side of the vehicle, a similar vehicle door assembly may be implemented on the front and rear doors on the right side of the vehicle. The same elements described herein would be configured accordingly (e.g., mirror image).

While various example embodiments are described herein in the context of the structural member 18 forming a B-pillar that is positioned at the side of the vehicle when the rear door 14 is in the closed configuration, these embodiments may also be applied to rear doors of a vehicle, such as the back of a cargo van, and the like. For example, in some embodiments, a similar structural member may be deployed from either a left door or right door at the rear end of a vehicle, where the structural member forms a center pillar at a rear of the vehicle when in a closed configuration. In this example embodiment, similar to side doors, the two doors at the back end of the vehicle swing out similarly to French doors and many delivery vehicles and vans. When in the closed configuration, the structural member provides added strength and rigidity to the back of the vehicle chassis that convention delivery vehicles or vans lack and without compromising the convenient loading and unloading of cargo.

The components of the vehicle door assembly 10, including the front and rear doors 12 and 14, the structural member 18, the upper and lower track structure members 20*a* and 20*b*, the pivot linkages 34 and 36, the protrusions 38 and 40, and the latching mechanisms 22, 24, 26, 28, 30, and 32 may be manufactured using any suitable forming process that builds each of these components to a desirable size and shape. These components are formed to desirable geometries to properly perform the functions described herein. For example, the front and rear doors 12 and 14 are formed to be pivotable between the open and closed configurations with respect to the chassis 16 of a vehicle. Also, the structural member 18 is formed to be deployable from the front door 12 and behind a rear door 14 at a junction between the front and rear doors 12 and 14 when in the closed configuration. The track structure 20 is formed to engage the components of the structural member 18 as described herein. The components may be manufactured from any suitable metallic material, such as steel, and/or other suitable non-metal materials. In other embodiments, the vehicle door assembly 10 may not have all of the components shown and/or may have other elements including other types of components instead of, or in addition to, those shown and described herein.

Although the present disclosure is illustrated and described herein with reference to illustrative embodiments and specific examples of the vehicle door assembly provided, it will be readily apparent to those of ordinary skill in the art that other embodiments and examples may perform similar functions and/or achieve like results. All such equivalent embodiment and examples are within the spirit and scope of the present disclosure and are intended to be covered by the following non-limiting claims for all purposes.

What is claimed is:

1. A vehicle door assembly, comprising:
a first door;
a second door;
wherein each of the first door and the second door are pivotable between an open configuration and a closed configuration with respect to a chassis of a vehicle;
a track structure member comprising a track;
a pivot linkage coupled with the second door; and
a structural member pivotably coupled to the second door via the pivot linkage, the structural member comprising a protrusion;
wherein:
in response to the second door and the first door being in the closed configuration, the structural member is disposed behind the first door at a junction between the first door and the second door and the protrusion is disposed in the track, and,
in response to the second door being in the open configuration, based on the pivot linkage, the structural member is pivotably deployed with respect to the second door and the protrusion is removed from the track.

2. The vehicle door assembly of claim 1, wherein the second door is pivotable to the open configuration and pivotable to the closed configuration when the first door is in the closed configuration, and the first door is pivotable to the open configuration and pivotable to the closed configuration when the second door is in the closed configuration.

3. The vehicle door assembly of claim 1, wherein the structural member is constrained by the track structure member at either or both of a top portion and at a bottom portion of the structural member.

4. The vehicle door assembly of claim 1, wherein, when both the first door and the second door are in the closed configuration, a first surface of the structural member overlaps both an inner surface of the first door and an inner surface of the second door.

5. The vehicle door assembly of claim 1, further comprising one or more latching mechanisms that secure the first door and the second door to the chassis of the vehicle.

6. The vehicle door assembly of claim 1, wherein the structural member forms a B-pillar of the vehicle.

7. The vehicle door assembly of claim 1, wherein the structural member forms a center pillar at a back of the vehicle.

8. A vehicle door assembly, comprising:
a door, wherein the door is pivotable between a first configuration and a second configuration different from the first configuration;
a pivot linkage rotationally coupled with the door;
a track structure member comprising a track that defines a first track portion and a second track portion angled with respect to the first track portion;
a structural member; and
a protrusion extending from the structural member, wherein:
in the first configuration, the structural member is covered by another door at a junction between the door, and
in response to transitioning from the first configuration to the second configuration, the protrusion is configured to travel through the first track portion and the second track portion to exit the track structure member.

9. The vehicle door assembly of claim 8, wherein each of the door and the other door is pivotable to the first configuration and to the second configuration regardless of the other of the door or the other door being in the first configuration or in the second configuration.

10. The vehicle door assembly of claim 8, wherein the structural member is pivotably deployed.

11. The vehicle door assembly of claim 8, further comprising a chassis, wherein the structural member is constrained by a track structure coupled to the chassis of the vehicle at either or both of a top portion and at a bottom portion of the structural member.

12. The vehicle door assembly of claim 11, further comprising one or more latching mechanisms that secure the door and the other door to the chassis of the vehicle.

13. The vehicle door assembly of claim 8, wherein the structural member forms a B-pillar of the vehicle.

14. The vehicle door assembly of claim 8, wherein the structural member forms a center pillar at a back of the vehicle.

15. A method for manufacturing a structural assembly for a door assembly for a vehicle, the method comprising:
pivotably coupling a first door to a chassis of a vehicle, wherein the first door is pivotable between an open configuration and a closed configuration with respect to the chassis of the vehicle;
pivotably coupling a second door to the chassis of the vehicle, wherein the second door is pivotable between an open configuration and a closed configuration with respect to the chassis of the vehicle; and
pivotably coupling, via a pivot linkage a structural member to the second door, the structural member comprising a protrusion that is disposed in a track of a track structure member in the closed configuration, wherein the structural member is deployable from the second door and behind the first door at a junction between the first door and the second door when in the closed configuration, and the structural member moves relative to the second door causing the protrusion to be removed from the track when the second door transitions to the open configuration.

16. The method of claim 15, wherein each of the first door and the second door is pivotable to the open configuration and to the closed configuration regardless of the other of the first door or the second door being in the open configuration or in the closed configuration.

17. The method of claim 15, wherein the structural member is pivotably deployed.

18. The method of claim 15, wherein the structural member is constrained by the track structure member coupled to the chassis of the vehicle at either or both of a top portion and at a bottom portion of the structural member.

19. The vehicle door assembly of claim 8, further comprising:
a second track structure member; and
a second protrusion movable with respect to the second track structure member.

20. The vehicle door assembly of claim 1, further comprising:
a second track structure member; and
a second protrusion movable with respect to the second track structure member.

* * * * *